United States Patent [19]

Polsfuss

[11] 4,038,716

[45] Aug. 2, 1977

[54] SWINGABLE YIELDING PAINT ROLLER

[76] Inventor: Marvin F. Polsfuss, 676 Silver St., San Francisco, Calif. 94115

[21] Appl. No.: 650,420

[22] Filed: Jan. 19, 1976

[51] Int. Cl.[2] ........................ B05C 17/02; B25G 3/38; F16C 11/00

[52] U.S. Cl. ................................ 15/230.11; 15/144 R; 403/111

[58] Field of Search .................. 15/27, 230.11, 248 A, 15/144 R, 144 A; 403/161, 164; 85/32 W; 248/383, 417

[56] References Cited

U.S. PATENT DOCUMENTS

| | | | |
|---|---|---|---|
| 2,397,238 | 3/1946 | Brose | 85/32 W UX |
| 2,817,107 | 12/1957 | Zellinger | 15/144 R |
| 3,199,826 | 8/1965 | Miller et al. | 248/417 |
| 3,408,676 | 11/1968 | Cayo | 15/230.11 |
| 3,432,193 | 3/1969 | Oxford | 403/111 |

FOREIGN PATENT DOCUMENTS

| | | | |
|---|---|---|---|
| 542,335 | 11/1955 | Belgium | 15/230.11 |
| 796,002 | 10/1968 | Canada | 15/144 A |
| 1,965,277 | 7/1971 | Germany | 15/144 R |

*Primary Examiner*—Daniel Blum

[57] ABSTRACT

A rotatably mounted paint roller to the axle of which a handle is pivotally attached through an intermediate oscillatable connector permitting rollable as well as swingable yieldingly limited movements of the roller in opposite directions within a predetermined plane.

3 Claims, 8 Drawing Figures

SWINGABLE YIELDING PAINT ROLLER

Considerable attention has been devoted in recent years to the manufacture and marketing of a number and variety of improved paint applicators to the end that the unskilled can wield the applicator with as much dexterity as the skilled artisan with increased efficiency and can accomplish a given job within a minimum of time. Many of the prior devices in thie field are disadvantageous in use because of the necessity of repeated adjustments of parts, and the inability of the user to reach high areas with facility as well as avoiding the spilling of paint on clothing, rugs, carpets and floors. Some of the jobs cannot be done with prior paint rollers unless half-size or over-size applicators are employed along with standard size rollers, thus increasing the expense of completing a given job, especially if it is to have lasting effectiveness with uniform coating throughout. The present invention is directed to an improved single roller which obviates many of the disadvantages of prior paint applicators; which is facile usable for reaching difficult areas that are impossible to reach with rollers of prior construction, because of its flexibility of handling which enables the painting of increased areas of a surface from one position; which applies the paint smoothly, evenly and with uniformity; and which reduces to a minimum the effort required to be expended to complete a given job.

A primary object of the invention is to provide a swingable yielding paint roller which is of such construction as to permit easy and quick changes in position of the roller body during application of paint not only to accessible but also to almost inaccessible areas of a wall, a ceiling or a floor from one position of the operator.

Another important object of the invention is to provide a swingable yielding paint roller of the indicated nature which is additionally characterized by its minimum number of parts, its inexpensive manufacture, its manoueverability, and its effectiveness in spreading the paint with a minimum of effort.

A still further object of the present invention is to provide a swingable yielding paint roller of the aforementioned character which can be dismantled and reassembled with facility in order to replace springs if necessary.

Other objects of the invention, together with some of the advantageous features thereof, will appear from the following description of an embodiment of the invention illustrated in the accompanying drawings which is an exemplification of the best mode of construction and manner of using the same. It is to be understood that the appended claims are intended to cover the embodiment shown as well as variations thereof within the scope and purview of the invention.

Referring to the drawings.

In its best mode of construction, the swingable yielding paint roller of my invention comprises an elongated cylinder, a paint-absorbing covering on the periphery of said cylinder, an axle extending through said cylinder on its longitudinal axis and on which it is mounted for rotation, an axle extension having a loop on the distal end thereof depending from one end of said axle; together with a handle terminating in a loop on the inner end thereof, and a connector joining said axle extension and said handle; said connector comprising a cover plate, a series of pins projecting beyond said cover plate for supporting said handle at opposite sides of the loop thereof, and a back plate, a series of pins projecting outwardly therefrom for supporting said axle extension on opposite sides of the loop at the distal end thereof, and a pivot pin extending through said cover plate and said back plate of said connector on which said roller is pivoted; said back plate having a pair of oppositely disposed channels therein, stops in said channels, and a pair of springs seated in said channels between said stops to enable said roller to be swung in opposite directions against the yieldingly movements of said springs between said stops upon the swingable movements of said rollers.

Figure 6:
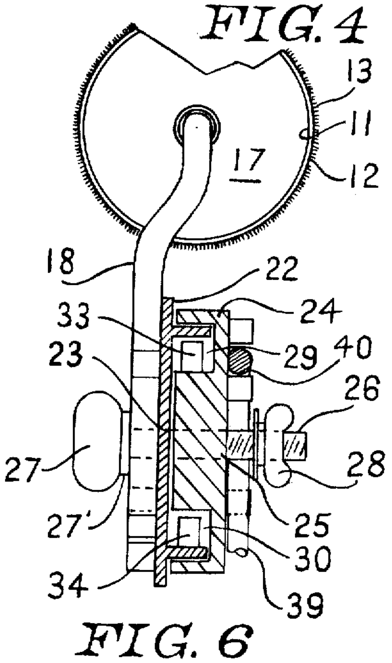
FIG. 6 is a fragmentary side elevational view, partly in section, of the preferred embodiment shown in FIG. 1, this view omitting the handle.
Figure 7:
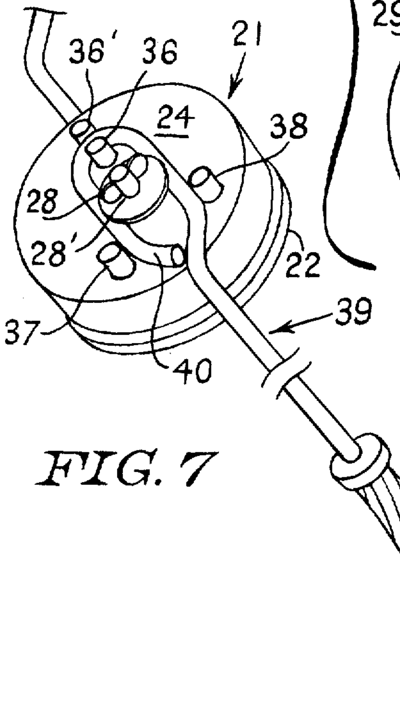
FIG. 7 is a fragmentary perspective view of the embodiment of the invention shown in FIG. 1 but with the roller omitted.
Figure 8:
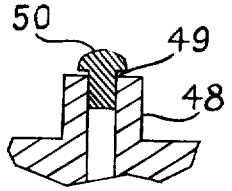
FIG. 8 is an enlarged sectional detail taken on the line 8—8 of FIG. 5.

In accordance with my invention, I provide a cylinder which is generally designated by the reference numeral 11 and which conveniently can be formed from metal or molded from a plastic material, as desired. The cylinder 11 is covered on its periphery 12 with a paint-retaining sponge-like material 13, such as rubber or wool, felt or the like, to pick up the paint in the customary manner from a pan thereof and to apply the same to a wall, ceiling or floor by rolling engagement therewith. The cylinder or paint roller 11 is mounted for rotation on an axle 14 which is coextensive in length as the cylinder and which is journaled in cylinder end plates 16 and 17. One end of the axle 14 is extended and double-bent upon itself to provide an axle extension 18 terminating at its distal end in a loop or eyelet 19 which is fixedly secured to a connector generally designated by the reference numeral 21 and conveniently comprising a back plate 22 having an inner annular flange projecting normal thereto and defining a rim, see FIG. 6, and also having a centrally located straight hole 23 therein, and a cover plate 24 having an inner annular flange projecting normal thereto and defining a rim and also having a centrally located straight hole 25 therein which is in alignment with hole 23 and through which aligned holes a standard thumb screw 26 extends; such thumb screw having the conventional thumb grip 27 at one end thereof for turning the same toward and away from the back plate of the connector 21 and for threadedly receiving a wing-nut 28 of the locking, friction or shake-proof type on its other end for turning the same toward and away from the cover plate 24 whereby the two plates may be either made inmmovable relative to one another by tightening down both the thumb grip 27 and the wing-nut 28 which can be loosened to permit relative movement between the plates 22 and 24 and the swinging of the roller 11 to the left and right.

Figures 1, 2, 3:
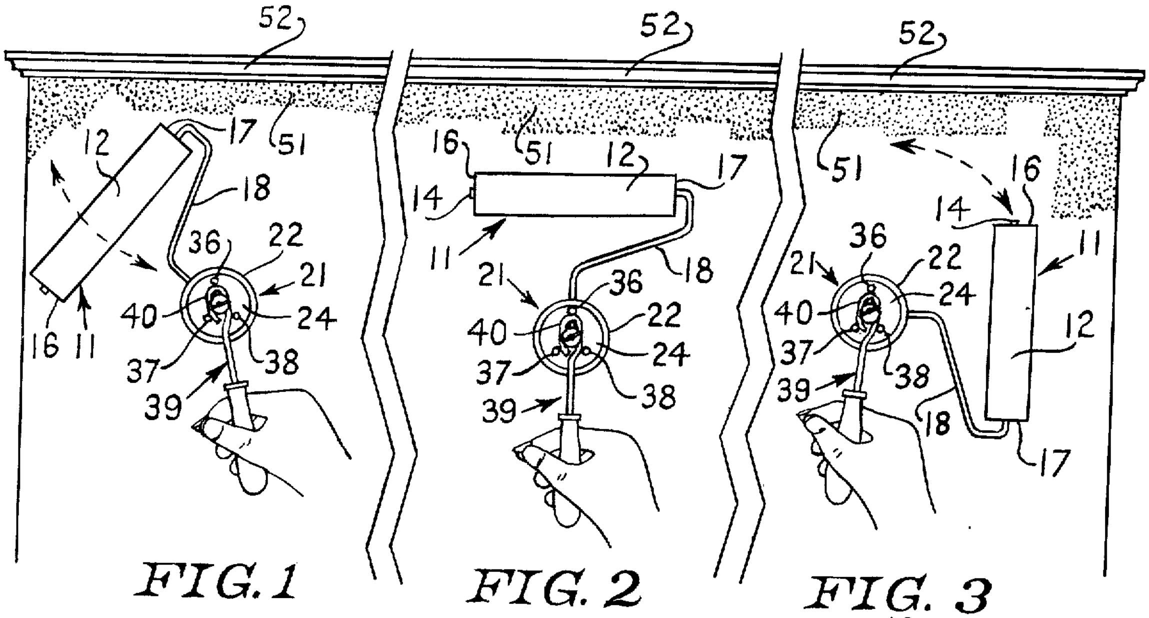
FIG. 1 is a front elevational view of the invention in a tilted position of the roller component thereof, this view illustrating the application of paint to a vertical wall, shown in broken elevation, adjacent to a ceiling with the handle in the hand of a user; the dotted arrow indicating the swing of the roller component in relation to the handle.
FIG. 2 is a view similar to FIG. 1 but with the roller component held and operative in a position normal to the handle.
FIG. 3 is a view similar to FIGS. 1 and 2 but with the roller component of the invention swung to its extreme position to the right of the handle for applying the paint transversely of the wall when desired.
Figure 4:
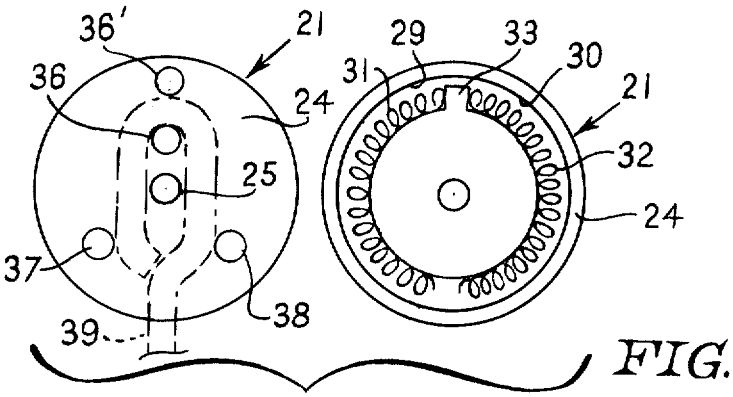
FIG. 4 is a plan view of one of the two components of a clamping element of a preferred embodiment of the invention establishing yielding connection between the roller and handle of the unit; this view showing the outside and inside of the cover thereof for clamping the handle in operative position.
Figure 5:
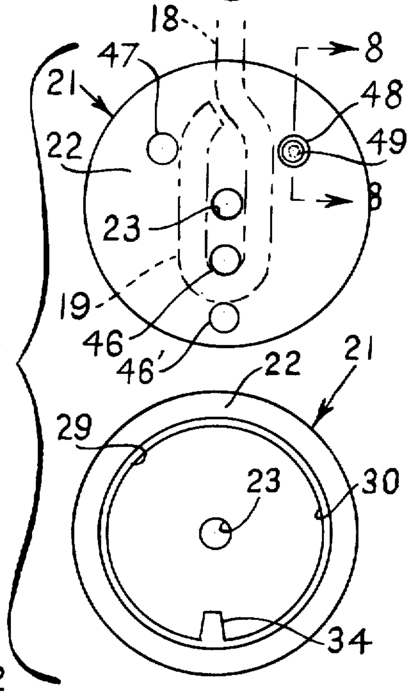
FIG. 5 is another plan view of one of the two component clamping element utilized in the preferred embodiment of the invention, this view showing the clamping connection of the roller axle extension to the back plate of the clamping element.

As particularly shown in FIGS. 4 and 5 of the annexed drawings, the cover plate 24 is fashioned with opposed inner recesses or channels 29 and 30 in which compression springs 31 and 32, respectively, are disposed; such springs being confined between suitable stops 33 and 34, respectively, which project inwardly from the back plate 22 and the cover plate 24, respectively, at diametrically opposite points thereof. When the roller 11 is swung by manipulation of an operator's hand in opposite directions within a common plane as hereinafter explained, the stop 33 acts as an impeller and urges the springs against the opposite stop 34 and compresses the same; it being understood that the weight of the roller 11 will hold the roller in its swung position to the left, as shown in FIG. 1, or to the right or opposite direction as shown in FIG. 3 of the drawings. It is to be especially observed by reference to FIG. 4 that I mount or provide on cover plate 24 of the connector 21 at least four pins 36, 36', 37 and 38 which project outwardly therefrom in a generally triangular array surrounding the pivot pin opening 25; such pins serving to support a handle 39 at its inner end which is turned upon itself to form a loop or eyelet 40 which extends around the outside of the projecting pin 36 as well as inside and between the two projecting pins 37 and 38. To insure a fixed connection of the handle 39 and the roller 11 through the intermediate connector 21, the additional pin 36' is projected from cover plate 24 in close proximity to the projecting pin 36 so that the remote inner end of the eyelet 40 is fitted between the pins 36 and 36'.

When the wing-nut 28 is turned down to its fullest extent, its associated washer 28' overlies and engages portions of the opposite sides of eyelet 40 of handle 39 thus establishing a rigid connection between the handle 39 and the roller 11 through intermediate connector 21. With reference to FIG. 5 of the annexed drawings, it will be observed that the axle extension 18 is similarly secured in fixed relation to the back plate 22 of intermediate connector 21; such back plate 22 being provided with similar outwardly projecting pins 46, 46', 47 and 48 arranged in generally triangular formation about pivot pin opening 23. The remote portion of eyelet 19 of axle extention 18 engages about the outside of pin 46 and the sides of eyelet 19 engaging the insides of and between the pins 47 and 48. The additional pin 46' projects in close proximity to pin 46 and the remote portion of the eyelet 19 is fitted between such pins 46 and 46' to provide a fixed connection of the axle extension 18 and the back plate 22 of the connector 21. As noted above, when a rigid connection between the handle 39 and the roller 11 is desired, the wing-nut 28 is turned down its fullest extent to bring its associated washer 28' into tight overlying engagement with the eyelet 40 which in turn brings the thumb grip 27 through its associated washer 27' into tight engagement with back plate 22 of the connector 21. In this position of the swingable roller of the present invention, it is usable in a conventional manner with the roller 11 normal to the handle 39, as shown in FIG. 2 of the annexed drawings. In this natural or normal position, the compression spring impeller or plate or stop 33 is on the inside of cover 24 while the stop 34 is approximately 180° opposite thereto and is a molded part of the back plate 22, see FIGS. 4 and 5, respectively.

However, when the wing-nut 28 is loosened approximately a half of a turn, a yieldingly floating movement can be effected in the action of the roller 11 by gripping the handle 39 and giving a slight or moderate flip of the hand or wrist either to the left or to the right, as indicated in FIGS. 1 and 3 of the accompanying drawings. Should the springs 31 and 32, or either of them, lose their effectiveness and need to be replaced with others, the connector assembly can readily be dissembled by removing wing-nut 28 and separating the back and cover plates 22 and 24. In order to handle the replacements with facility, I provide a hole 49 in the pin 48 of plate 22 receiving an ordinary nail or the like, not shown, on which the connector 21 can be held during the removal and replacement of a spring or springs; such hole normally being otherwise closed by a plug 50.

The swingable yielding movement of the roller has been found advantageous for reaching difficult and almost inaccessible areas of a wall 51 or a ceiling 52 being painted from a single position. This swingable yielding movement of roller 11 afforded by loosening the wing-nut 28 slightly to permit relative movement between the back plate 22 and cover plate 24 of connector 21 which is oscillatory in general nature. This action, which can be made to occur by a slight flip of the wrist to the left or to the right as desired while in the course of painting a wall, floor, ceiling or portion thereof including adjacent panels or jambs of a door or doors in the wall, causes the stop or compressor plate 33 to yieldingly compress the spring 31 or the spring 32 within channels 29 or 30 on the inside of the cover plate 24 toward the stop 34 on the back plate 22 of connector 21 with the result that the weight of the roller 31 affords a semi-floating action thereof. During this yielding movement of the roller 11 while resting on either spring 31 or spring 32 depending upon which way or direction the wrist of the user flips the roller, the roller is being pressed against the area being painted with the same requisite external force so that in whatever attitude of the roller with relation to handle 39, the area including all portions thereof, receives a uniform even coating of paint with a minimum of effort and time with fewer changes in position of the user. Whenever the paint roller 11 is to be used in a normal relation to the handle 39, the wing-nut 28 can again be tightened to its fullest extent so that the roller 11 is rigidly connected to the handle through the intermediate connector 21.

It is to be understood that the appended claims are intended to cover the embodiment illustrated in the accompanying drawings as well as variations thereof within the scope and purview of my invention.

I claim:

1. A swingable yielding paint roller device comprising an axle, a paint-applying roller rotatably mounted on said axle, an axle extension depending from said axle, a handle for manipulating said roller in rolling engagement with a paint-receiving surface, an intermediate two-plate oscillatable connector comprising a back plate fixedly secured to said axle extension and a cover plate fixedly secured to said handle and detachably secured to said back plate; said cover plate having a recess therein, a pair of compression springs in said recess arranged in opposed relation to one another, means for establishing relative pivotal movement between said back plate and said cover plate including a thumb screw extending through said back and cover plates and a shakeproof wing nut threaded on said thumb screw, and means on said connector for yieldingly compressing said springs during relative movement between said back plate and said cover plate upon the oscillatable movement of said handle to the left and to the right while maintaining the roller in engagement with areas of a paint-receiving surface thereby painting otherwise inaccessible areas from one position of the user.

2. A swingable yielding paint roller device as set forth in claim 3 wherein said wing nut is movable from a seated to an unseated position with respect to said cover plate; said back plate and said cover plate being relatively movable with said wing-nut on said thumb screw in the unseated position with respect to said cover plate permitting swinging of said roller to the left and to the right in a single plane during painting operations with said roller in rolling engagement with a paint-receiving surface.

3. A swingable yieldable paint roller device as set forth in claim 1, wherein said means on said connector comprises a spring-compressing element on said cover plate, and a stop on said back plate between which said compressing springs are confined; said spring-compressing element urging said springs toward said stop upon the flipping of said roller to the right and to the left with said wing-nut in an unseated position with respect to said cover plate whereby said roller is yieldingly supported on said springs.

* * * * *